United States Patent Office 3,074,796
Patented Jan. 22, 1963

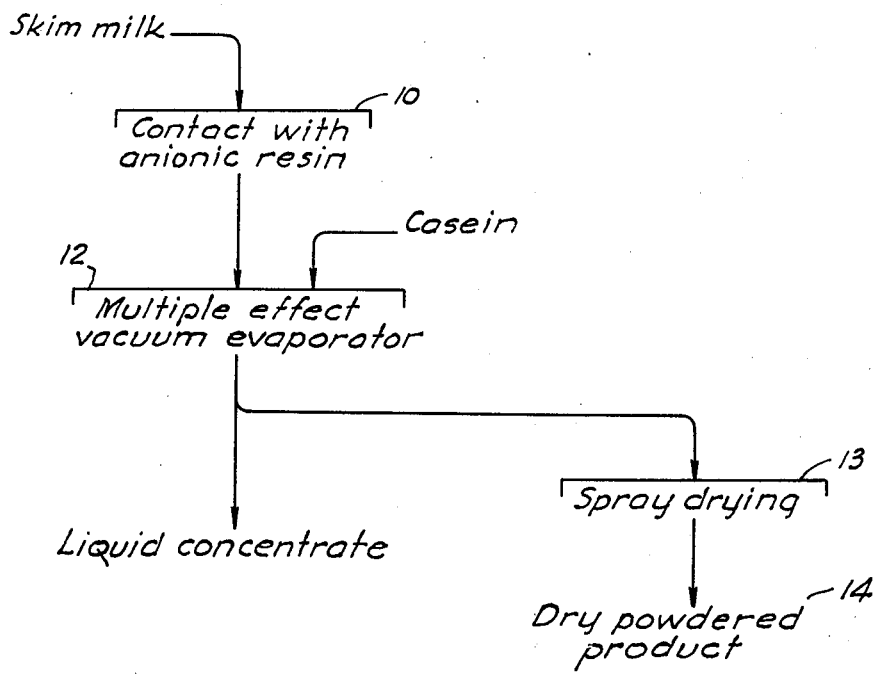

3,074,796
HIGH PROTEIN MILK PRODUCT AND PROCESS
David D. Peebles, Davis, and Paul D. Clary, Jr., Petaluma, Calif., assignors to Foremost Dairies, Inc., San Francisco, Calif., a corporation of New York
Filed Sept. 2, 1958, Ser. No. 758,402
3 Claims. (Cl. 99—55)

This invention relates generally to milk products having a relatively high percentage of milk protein, and to processes for their manufacture.

In the past, it has been known that the protein content of a milk product like skim milk can be increased by dispersing therein casein curd precipitated from skim or whole milk. The conventional procedure has been to use a chemical such as sodium carbonate, to raise the pH value above the normal pH of fresh milk, thereby forming a stable colloidal solution. Products made in this way have an impaired flavor, due to the presence of added chemical and its effect on the casein and other ingredients of the milk. Furthermore, because of the chemical content, such high protein milk cannot be conveniently used in conventional processes for the manufacture of products such as cottage cheese. In an effort to eliminate or reduce the chemical required, it has been proposed to comminute freshly precipitated casein in a liquid medium, such as water, and then add this material to the milk, preferably with small amounts of a chemical like lime. Here again, without the use of lime or like chemical, it is not possible to make a stable product having a protein content of the order of 60 to 70% (dry solids basis).

In general, it is an object of the present invention to provide an effective and simple process for forming a high protein milk product, without the use of added chemical.

Another object of the invention is to provide a process of the above character which avoids the use of special mixing or homogenizing equipment for complete dispersion of the casein.

Another object of the invention is to provide a novel high protein milk product which can be used to advantage for the manufacture of such products as cottage cheese.

Additional objects and features of the invention will appear from the following description in which the preferred embodiments have been set forth in detail in conjunction with the accompanying drawing.

Referring to the drawing:

The single FIGURE is a flow sheet illustrating one procedure for carrying out the present invention.

In accordance with the present invention, we treat a liquid milk whereby it is conditioned to more effectively accommodate added casein. A freshly precipitated casein curd is introduced directly into the conditioned milk, and the milk is subjected to further treatment to produce the finished product. Instead of using conventional dispersing methods involving mechanical mixing and homogenizing, we preferably carry out dispersion simultaneously with vacuum evaporation. Our final product provides a novel high protein milk at protein levels of the order of 60 to 70%.

In accordance with the procedure shown in the drawing, fresh skim milk is first conditioned by contacting it with an anionic exchange resin, in step 10. A suitable procedure is to flow the milk upwardly through a column of granular resin. This serves to remove acidic components, without altering the basic makeup of the milk. Assuming use of the column method, the pH of the milk leaving the column will vary somewhat between the beginning and end of the run. In a typical instance, the average pH of the milk after such treatment is of the order of 8.4–8.5.

Of the acidic ions removed by the resin, the major constituents are chlorine citrate and phosphate ions, which are present in salts of such elements as sodium, calcium, magnesium and potassium. One can obtain a fair quantitative check of the extent to which acidic ions are removed by noting the change in pH, or by an analysis of the amount of chlorides present. For example, when the amount of chlorides present in fresh skim milk has been reduced by about 50%, the pH value is increased from an initial 6.8 to about 8.4–8.5.

After being conditioned, a measured amount of casein is added to the milk, and the mixture supplied to the evaporating operation 12. Freshly precipitated casein is employed, which has been subjected to washing or like treatment to reduce its acidity. In general, the casein is acid precipitated, although for some purposes precipitation by lactic fermentation (i.e. by means of bacterially produced acid) is to be preferred.

The vacuum evaporating operation 12 can be carried out by using equipment of the type disclosed in Peebles et al., 2,090,985. This type of equipment is characterized by relatively rapid flow of mixed liquid and vapor phase material through the evaporating tubes. Although liquid flow velocities can only be estimated, vapor velocities in this equipment, in typical instances, may be of the order of 160 to 180 feet per second at the discharge end of the evaporator tubes. A single stage of such an evaporator can be used, with continued recirculation of the material through this equipment, until the desired concentration is obtained. Evaporation is continued over a sufficient period of time to cause the liquid to reach the desired degree of concentration. Thereafter the concentrate is discharged from the equipment. In carrying out the present process, it is desirable to avoid excessive temperatures such as might cause some denaturing of the milk protein. Also, high temperatures tend to shrink the curd and make hard grains which dissolve very slowly. Thus it is generally desirable to operate the evaporator whereby the temperature of the liquid being recirculated is of the order of 90 to 120°. The concentration of the final liquid product can be of the order of 30–40% solids.

Dispersion of the casein in the skim milk takes place simultaneously with the evaporating operation. It is aided by high velocity flow of mixed liquid-vapor phase material in the evaporating tubes, with its attendant turbulence and mechanical attrition.

Instead of using an evaporator of the batch type, with continued recirculation, it is possible to evaporate and carry out dispersion of the casein by the use of a continuous multiple effect evaporator of the type disclosed in Peebles et al., 2,090,985. Thus the evaporating equipment may have four stages or effects, with the milk being preheated and supplied to the first effect at a temperature of the order of 160° F., and the concentrate removed from the last effect at a temperature of the order of 90–120° F.

The total time period of treatment within the evaporating equipment may be of the order of 1 minute or more, during which time the desired concentration is obtained, and complete dispersion takes place.

As shown in the flow sheet, a portion of the liquid concentrate from the evaporating operation 12 can be withdrawn and used for various purposes, for example, as is as a fluid product or as an ingredient, or the concentrate may be frozen, canned, or otherwise used in suitable fashion. Another portion of the concentrate can be supplied to the spray drying operation 15, for the manufacture of a high protein dry milk powder or similar products.

Previous reference has been made to the use of fresh, acid precipitated casein curd. Before washing, such a curd contains considerable acid. Preferably, washing is carried out whereby the titratable acidity (of the liquid expressed from the curd) is of the order of 0.03% or less, and preferably from about 0.001 to 0.02%. In the formation of the curd, it is desirable to avoid excessive heat treatment temperatures. In general, it is satisfactory to precipitate at temperatures of the order of from 80 to 110° F., and at a pH range from 4.3 to 4.7, depending upon the temperature. Final elevation of the temperature to about 120° F. can be employed to facilitate separation of the curd. Higher temperatures, such as are commonly applied to harden casein curd, should be avoided.

Introduction of the moist curd into the conditioned or de-anionized skim milk, results in a change in the pH value of the mixture. Assuming that the de-anionized skim milk is at a pH of the order of from 8.4 to 8.5, introduction of the casein curd may decrease the pH to a value of the order of pH 6.4 to 7.0, depending upon the amount of casein added, and its acidity. Some further reduction in pH value occurs in step 12, due to release of acids from the curd during dispersion. Assuming that sufficient amounts of moist casein curd are being added to provide a protein level in the final product ranging from 60 to 70%, that the curd is washed to provide a titratable acidity of from 0.01% to 0.02% and that the conditioned or de-anionized skim milk supplied to operation 12 has a pH of the order of 8.4–8.5, the pH of the final liquid product will be of a value of the order of from pH 6.2 to 6.5.

It has been found that previous heat treatment of the skim milk employed tends to impair and limit the amount of protein which can be added. Therefore, we prefer to use raw skim milk which has not been subjected to previous heat treatment. However, some pasteurization at temperatures of the order of 145° F. can be applied, particularly where it is not necessary to provide a protein content in the final product in excess of about 50% (dry solids basis). In any event, there should be no substantial denaturing or coagulation of the skim milk by heat treatment.

Specific examples of our process are as follows:

Example 1

Raw skim milk which had not been subjected to previous heat treatment was passed through a vertical column containing granular anionic exchange resin. We employed resin manufactured by Rohm & Haas Co., and sold under the trade designation of Amberlite IR-45. The milk initially had a pH of 6.7 and after contact with the resin, the batch had an average pH of about 8.5. A fresh casein curd was prepared by precipitation from our skim milk at a pH of 4.6, using hydrochloric acid, and at a temperature of about 100° F. The curd was drained and washed with fresh water adjusted with hydrochloric acid to pH 4.5, to produce a washed curd having a titratable acidity (of the liquid content) of about 0.02% and containing about 27% solids. This soft, freshly precipitated curd was added to the de-anionized skim milk in proportions of about 0.80 pound of the curd for each gallon of the skim milk. This mixture of curd solids and skim milk was then fed to a single stage evaporator of the type disclosed in Peebles et al. Patent 2,090,985. The maximum temperature of the liquid material during evaporation was about 145° F. Dissolution of the casein curd took place during the preliminary stages of evaporation and recirculation, whereby at the end of the evaporating cycle, the casein was completely dissolved in a concentrate containing about 35.0% solids. All of the protein of this product was in the form of a stable colloidal solution. Centrifuge tests revealed that substantially none of the casein content was in unstable or noncolloidal form. The hydrogen ion concentration of the finished liquid product was about pH 6.5, and the protein level was 51.0% (dry solids basis). The ash content was of the order of 6.1%. It had an excellent fresh flavor, completely free of off or impaired flavor such as may result from added chemical.

Example 2

The same procedure was followed as in Example 1, but the amount of curd introduced into the de-anionized skim milk was increased to the proportions of about 1.75 pounds of curd for each gallon skim milk. The pH value of the mixture was about 6.7 before passing through the evaporating operation, and after evaporation the pH of the finished liquid product was about 6.2. Evaporation was continued to provide a finished liquid product containing about 32.0% solids, which had a protein content of about 61.0% (dry solids basis). This product had the same properties as the product from Example 1.

Example 3

Samples of the liquid products obtained in accordance with Examples 1 and 2 were spray dried by the use of ordinary spray drying equipment, to produce powdered milk products. The high protein milk powder obtained in this fashion readily mixed with water to form a stable reconstituted milk. The powder produced by spray drying the material from Example 1, when mixed with water in proportions of 10 grams of powder to 100 cc. of distilled water, formed a stable reconsistuted milk having a pH of about 6.5.

In the foregoing examples, we have referred to the use of raw skim milk as a source of lacteal material. The absence of fat in such material facilitates the de-anionizing operation. If fat is desired in the final product, it can be added before or after concentration.

The high protein milk powder produced as described above can be used advantageously in the manufacture of frozen foods, such as various ice milks and ice cream. The use of our product in such mixes serves to increase the relative amount of protein present compared to other milk solids. It has been found that the high protein level thus obtained aids in the production of a smooth frozen product relatively free of lactose crystals and having the ability to maintain overruns of the order of 100% or more without shrinkage. Also the high protein content has dietetic advantages, and makes it possible to minimize or eliminate ingredients such as gums, gelatin, and the like which are commonly added to ices and ice creams to obtain greater smoothness and body.

A further useful application for our product is in the manufacture of fresh cottage cheese for human consumption. Thus, without altering other steps of the present day cheese making techniques, our product can be blended with incoming skim milk to greatly increase the yield of cottage cheese being obtained from a particular plant equipment. It appears that certain unexpected benefits are obtained in this connection, including a reduction in the floatability of the curd, and greter compatibility with use of certain fermenting organisms which are desirable in many instances to develop aromatic flavoring constituents.

The amount of casein which may be added is dependent upon various phases of the process, including the extent of de-anionizing of the skim milk, and the residual acidity of the washed curd. Use of the de-anionizing step greatly increased the amount of protein which can be added and maintained in stable dispersion. Thus with the present process, the amount of casein added may be such as to provide a final powdered product with a protein content within the high range previously mentioned, namely from 60 to 70%. This high protein level is attained without the use of added chemicals, and in a dry material which when reconstituted with water, provides a pH comparable to ordinary fresh milk.

This application is a continuation-in-part of our co-pending applications Serial No. 397,954, filed December 14, 1953, and Serial No. 629,855, filed December 21, 1956.

We claim:

1. In a process for the manufacture of a high protein milk product, the steps of de-anionizing raw liquid skim milk to provide a milk having a pH value of from 8.4 to 8.5, introducing into such milk a freshly precipitated and washed casein curd, the titratable acidity of the liquid that can be expressed from the curd being of the order of 0.03% or less, the amount of curd added being such as to provide a mixture having a pH value of the order of 6.4 to 7.0 and to provide a protein content in the final product of from 60 to 70% on a dry solids basis, and then dispersing the added curd in the mix by subjecting the mix to turbulence and mechanical attrition while simultaneously concentrating the same by evaporation.

2. A process as in claim 1 in which the resulting concentrate is subjected to spray drying to produce a dry powdered product.

3. In a process for the manufacture of a high protein milk product, the steps of deanionizing raw liquid skim milk to provide a milk having a pH value of from 8.4 to 8.5, forming a freshly precipitated casein curd by acid precipitation from raw liquid skim milk, subjecting the curd to washing to reduce its titratable acidity, introducing the washed curd into the deanionized skim milk, the amount of curd added being such as to provide a mixture having a pH value of the order of 6.4 to 7.0, and to provide a protein content in the final product of from about 50 to 70% on a dry solid basis, and then dispersing the added curd in the mix by subjecting the mix to turbulence and mechanical attrition while simultaneously concentrating the same by evaporation.

References Cited in the file of this patent

UNITED STATES PATENTS

| | | |
|---|---|---|
| 1,882,637 | Johnson et al. | Oct. 11, 1932 |
| 1,882,638 | Johnson et al. | Oct. 11, 1932 |
| 2,142,093 | Clickner | Jan. 3, 1939 |
| 2,469,683 | Dudley et al. | May 10, 1949 |
| 2,503,866 | Chrysler et al. | Apr. 11, 1950 |
| 2,511,825 | Myers | June 13, 1950 |
| 2,682,467 | Brereton et al. | June 29, 1954 |

OTHER REFERENCES

Ind. & Eng. Chem., March 1949, pp. 457 to 459.